United States Patent
Mackiewich et al.

(10) Patent No.: US 7,286,533 B2
(45) Date of Patent: Oct. 23, 2007

(54) METHOD AND APPARATUS FOR ROUTING DATA FRAMES

(75) Inventors: Blair T. Mackiewich, Surrey (CA); Yuming Wen, Delta (CA); Radu C. Ungureanu, Coquitlam (CA)

(73) Assignee: Alcatel-Lucent Canada Inc., Ottawa, Ontario (CA)

( * ) Notice: Subject to any disclaimer, the term of this patent is extended or adjusted under 35 U.S.C. 154(b) by 1176 days.

(21) Appl. No.: 10/026,735

(22) Filed: Dec. 27, 2001

(65) Prior Publication Data

US 2004/0223501 A1    Nov. 11, 2004

(51) Int. Cl.
*H04L 12/56* (2006.01)
*H04L 12/28* (2006.01)

(52) U.S. Cl. .................. 370/392; 370/395.31; 370/401
(58) Field of Classification Search ...................... None
See application file for complete search history.

(56) References Cited

U.S. PATENT DOCUMENTS

| | | | | |
|---|---|---|---|---|
| 5,825,772 A | * | 10/1998 | Dobbins et al. | 370/396 |
| 5,892,903 A | * | 4/1999 | Klaus | 726/25 |
| 6,128,296 A | * | 10/2000 | Daruwalla et al. | 370/389 |
| 6,181,702 B1 | * | 1/2001 | Egbert | 370/401 |
| 6,438,133 B1 | * | 8/2002 | Ervin et al. | 370/403 |
| 6,449,279 B1 | * | 9/2002 | Belser et al. | 370/397 |
| 6,526,066 B1 | * | 2/2003 | Weaver | 370/465 |
| 6,765,914 B1 | * | 7/2004 | Jain et al. | 370/395.31 |
| 7,170,897 B2 | * | 1/2007 | Mackiewich et al. | 370/401 |
| 2002/0083344 A1 | * | 6/2002 | Vairavan | 713/201 |
| 2002/0089983 A1 | * | 7/2002 | Lin et al. | 370/392 |
| 2003/0198182 A1 | * | 10/2003 | Pegrum et al. | 370/225 |
| 2005/0083949 A1 | * | 4/2005 | Dobbins et al. | 370/395.53 |
| 2006/0262798 A1 | * | 11/2006 | Joshi et al. | 370/392 |

OTHER PUBLICATIONS

IEEE Std 802.1Q-1998. *IEEE Standards for Local and Metropolitan Area Networks: Virtual Bridged Local Area Networks*, Institute of Electrical and Electronics Engineers Inc. Mar. 8, 1999.

\* cited by examiner

*Primary Examiner*—Kwang Bin Yao
*Assistant Examiner*—Warner Wong
(74) *Attorney, Agent, or Firm*—Oyen Wiggs Green & Mutala LLP

(57) ABSTRACT

A bridge has a shared forwarding database and a plurality of ports. The bridge handles data associated with multiple virtual local area networks (VLANs). The shared forwarding database includes static entries for one or more devices which belong to multiple VLANs. Upon receiving data addressed to one of the one or more devices the bridge determines that the data should be source routed by retrieving the static entry from the shared forwarding database. The bridge then selects a bridge port to which the data should be forwarded on the basis of information in the data, such as a VLAN ID field.

20 Claims, 3 Drawing Sheets

METHOD AND APPARATUS FOR ROUTING DATA FRAMES

TECHNICAL FIELD

The invention relates to data communication networks. The invention relates in particular to bridges and to methods for bridging data belonging to multiple virtual LANs.

BACKGROUND

A virtual LAN ("VLAN") is a group of networked devices that are in a separate broadcast domain even though they share a physical medium with other networked devices which do not belong to the VLAN. For example, a virtual LAN may comprise a number of LAN segments which are on different ports of a switch. Data may be carried between segments of a virtual LAN over connections in a shared network. The shared network may operate according to a networking protocol different from that of the network segments. For example, two segments of an ethernet network may be connected by a connection in an asynchronous transfer mode (ATM) network. Each of the network segments may be interfaced to the shared network by a bridge.

IEEE standard 802.1Q provides a set of capabilities which permit media access control (MAC) bridges to define and manage virtual LANs. IEEE standard 802.1D describes the operation of MAC bridges. In this disclosure the term "VLAN" is not limited to VLANs which operate according to the IEEE 802.1Q or 802.1D specifications.

A typical bridge comprises a plurality of bridge ports. The bridge receives data frames at its bridge ports. The bridge has access to a forwarding database (the forwarding database is sometimes called a "filtering database") which associates the addresses of various devices with specific ones of the bridge ports. When the bridge receives data addressed to a specific destination address at a bridge port, the bridge looks up the destination address in the forwarding database. If there exists an entry in the forwarding database which associates the destination address with a bridge port then the bridge determines whether the bridge port associated with the destination address is the same bridge port at which the data was received. If so, the bridge may discard the data. Otherwise the bridge forwards the data to the bridge port identified in the forwarding database. If there is no entry for the destination address in the forwarding database then the bridge may forward the data to multiple bridge ports (this is sometimes called "flooding" the bridge ports) so that the data can reach its destination.

A bridge is typically configured to build a forwarding database dynamically. When the bridge receives data at a bridge port it inspects the data for a source address (bridges which operate according to 802.1Q and/or 802.1D typically inspect the data for the MAC address of the device at which the data originated). If the bridge can ascertain a source address for the data then the bridge may automatically create in the forwarding database an entry which associates the source address with the bridge port at which the data arrived at the bridge. If there is an existing entry in the forwarding database which associates the source address with a different bridge port then the bridge may update the existing entry to associate the source address with the bridge port at which the data arrived at the bridge.

The 802.1Q specification provides for two different types of forwarding database. One type of forwarding database, called a shared forwarding database, is shared between multiple VLANs. The specification also describes a second type of forwarding database called an "independent forwarding database". Where a bridge uses independent forwarding databases, a separate forwarding database is provided for each VLAN. Providing a separate forwarding database for each VLAN provides flexibility but imposes more stringent hardware requirements. Each forwarding database requires significant memory and other resources.

Data which belongs to a VLAN may be tagged to identify the fact that the data belongs to the VLAN. A VLAN tag may comprise, for example, a field in the header of a data frame. The tag may, for example, comprise a few bits which identify a VLAN ID number ("VID"). It is sometimes necessary for devices in a VLAN to send data to or receive data from a device which is not VLAN-aware. It can be necessary to remove the VLAN tag to provide an untagged data frame before sending data to such devices.

Bridges which have shared filtering databases, as described above, cannot be used effectively in cases where a single non-VLAN-aware networked device may be required to exchange data with other devices which belong to multiple VLANs. Where traffic for each of the VLANs is carried on a different set of the bridge ports, the non-VLAN-aware device may send data to more than one port of the bridge. This causes problems because each time the device sends data to a different one of the bridge ports the bridge updates its shared forwarding database to associate the device with that bridge port. A filtering function on each bridge port could be used to determine the correct VLAN for data packets received at that bridge port. Such a filter would, for example, snoop ethernet packets for specific information such as IP address, UDP port, etc. Such filters are expensive to implement because extra data in every frame must be read. Depending on the nature of the attached device, such a filter may still fail to identify the appropriate VLAN.

U.S. Pat. No. 6,137,797 describes a device for interconnecting local area networks. The device has ports for attaching LAN segments and port modules for connecting the ports to a switch fabric. Each of the port modules includes a mechanism for identifying a port through which a received frame is to be routed by searching a routing information field of the received frame.

There is a need for cost effective methods and apparatus for routing ethernet frames to virtual LANs. There is a particular need for such methods and apparatus which permit an end station having a single address to exist on multiple bridge ports which belong to separate VLANs.

SUMMARY OF INVENTION

This invention relates to exchanging data between devices belonging to a VLAN and devices which are not VLAN-aware. One aspect of the invention provides a method for routing data frames to a bridge port in a bridge device having a shared forwarding database. The method comprises creating an entry in the shared forwarding database, the entry indicating that data addressed to an address should be source routed; receiving a data frame addressed to the address; determining that the data frame requires source routing based on the entry in the shared forwarding database; reading source routing data from the data frame; identifying a port corresponding to the source routing data; and, sending the data frame to the identified port.

Another aspect of the invention provides a bridge comprising a plurality of bridge ports and a shared forwarding database. The shared forwarding database comprises a plurality of first records, each first record associating an address with one of the bridge ports, and at least one second record, the second record associating an address with information indicating that data sent to the address of the second record requires source routing. The bridge is configured to respond to receipt of data addressed to the address of the second record by: determining from the second record that the data requires source routing; reading source routing information from the data; and, forward the data to one of the bridge ports based upon the source routing information.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention relates to bridges which handle data associated with multiple VLANs and have shared forwarding databases. Bridges according to the invention have entries in their shared forwarding databases which indicate that data addressed to particular destinations should be source routed.

Figure 1:
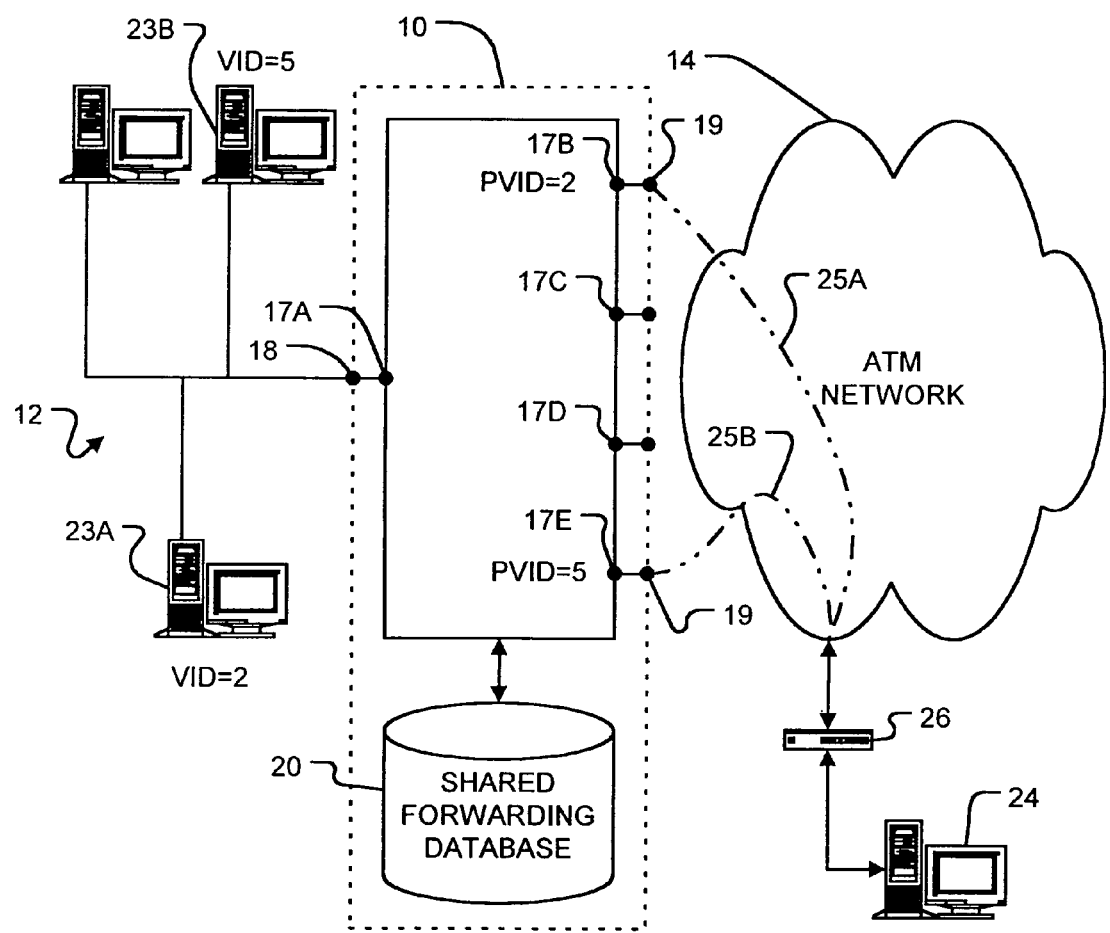
FIG. 1 is a block diagram of a bridge according to the invention.

FIG. 1 illustrates a bridge 10 which connects an ethernet segment 12 to other devices or network segments. Bridge 10 has a plurality of bridge ports 17. A first bridge port 17A is connected to a local interface 18 which connects bridge 10 to ethernet segment 12. A plurality of other bridge ports 17 (in the illustrated example, four more bridge ports 17B through 17E) connect bridge 10 to other devices or network segments by way of one or more remote interface ports 19.

In this example, remote interface ports 19 each connect to connections in a connection-based network 14. In this example, the connection-based network comprises an ATM network. Each remote interface port 19 can serve as a termination endpoint for one or more virtual connections in ATM network 14. Remote interface ports 19 could, but do not need to, comprise separate physical devices. Remote interface ports 19 may comprise distinct physical interfaces, distinct virtual interfaces, or a combination of distinct physical and virtual interfaces. Remote interface ports 19 may comprise mechanisms for encapsulating ethernet frames for transport across connection-based network 14.

Bridge 10 comprises a shared forwarding database 20. When an ethernet data frame is received at first bridge port 17A, bridge 10 reads a destination address for the data frame and looks up the destination address in forwarding database 20. Forwarding database 20 may return information which specifies a bridge port 17 to which the data of the ethernet data frame should be directed for delivery to its destination address.

Bridge 10 handles data for more than one VLAN. This may be the case, for example, when one or more VLAN-aware devices 23A on segment 12 belong to a first VLAN which may, for example, have a VID=2, and one or more other devices 23B on segment 12 belong to a second VLAN which, for example, has a VID=5. The VLAN-aware devices may comprise workstations, servers, switches which connect to other network segments, or other VLAN-aware networked devices. In the embodiment illustrated in FIG. 1, segment 12 comprises a trunk link on which ethernet frames are tagged with the VID of the VLAN to which they belong. In the illustrated embodiment, ports 17B through 17E connect to access links on which the data is untagged.

In the embodiment of FIG. 1, data belonging to different VLANs is carried over different connections in ATM network 14. For example, data for different VLANs may be carried on different point-to-multipoint connections in ATM network 14 as described in the co-pending and commonly owned patent application filed on Dec. 6, 2001 and entitled METHOD AND APPARATUS FOR IMPLEMENTING POINT-TO-MULTIPOINT COMMUNICATIONS OVER A CONNECTION-BASED DATA COMMUNICATION NETWORK which is incorporated herein by reference.

Consider further the situation that exists when there is a device, such as a server 24 which belongs to two or more of the VLANs for which data is carried on ethernet segment 12. Server 24 is not VLAN-aware. Data for the first VLAN with VID=2 is to be carried to and from server 24 on a first connection 25A which connects to port 17B. Data for the second VLAN with VID=5 is to be carried to and from server 24 on a second connection 25B which connects to port 17E. The data on connections 25A and 25B is untagged. Essentially server 24 may treat the first and second VLANs as being different subnets or ports. This situation creates a problem at bridge 10 because, although server 24 may have a single MAC address, bridge 10 receives data from server 24 at different bridge ports depending upon the VLAN to which the data belongs.

Consider what would occur if a standard 802.1Q bridge which has a shared forwarding database and ports 17B and 17E in a learning state which causes them to update the shared forwarding database 20 when data is received at the ports were in the place of bridge 10. The bridge would associate the MAC address of server 24 with port 17B each time bridge 10 received data from server 24 on port 17B. When the bridge received data from server 24 at port 17E the bridge would update shared forwarding database 20 to associate the MAC address of server 24 with bridge port 17E.

This invention addresses this problem by providing in shared forwarding database 20 a static entry which associates the address of server 24 (which may be the MAC address of server 24) with information identifying the address of server 24 as an address for which source routing is required. The information may, for example, comprise a reserved value stored in shared filtering database 20 in place of a port ID number. The reserved value indicates source routing. Because the entry is designated as a static entry, bridge 10 does not automatically update the static entry when it receives data originating from server 24.

When bridge 10 receives from segment 12 VLAN-tagged data destined for server 24 then bridge 10 looks up the destination address in shared forwarding database 20. Bridge 10 retrieves the reserved value that indicates that data destined for server 24 should be source-routed. Bridge 10 then inspects the VID associated with the data. Bridge 10 then forwards the data to a selected bridge port which is associated with that VID. Bridge 10 may strip the VLAN tag from the data before forwarding the data to server 24 by way of the selected bridge port.

Bridge 10 may have access to a data structure which provides a configurable association between the VID of source-routed data and the available bridge ports of bridge 10. In the alternative, the association between VIDs and bridge ports 17 may be fixed. In the illustrated embodiment, each bridge port 17 has a port VLAN identifier ("PVID"). For example, bridge ports 17B through 17E may respectively have the PVIDs 2, 3, 4 and 5. There is may be a non-configurable association between the PVIDs and the bridge ports 17. For example, each bridge port may correspond to a specific predetermined PVID.

In some configurations the same PVID may be associated with more than one bridge port. In such cases, a rule may be applied to identify a single port by way of which the frame should be forwarded. For example, the ports may have an ordering and bridge 10 may forward the data to the first port which has a PVID matching the VID of the data. The ordering may be provided by the sequence in which records of the bridge ports occur in a data structure, a sequence of physical port ID identifiers, or the like.

Data from server 24 may arrive at bridge 10 by way of either of ports 17B and 17E. Assuming that the port in question is in a learning state, bridge 10 looks up the MAC address of server 24 in shared filtering database 20. Upon finding that the MAC address of server 24 has a static entry bridge 10 does not make an entry in the shared forwarding database 20 which associates the MAC address of server 24 with the port at which the data was received.

Bridge 10 looks up the destination address for the received data in shared forwarding database 20. Bridge 10 determines that the data should be forwarded to bridge port 17A. Bridge 10 identifies bridge port 17A as being connected to a trunk link and tags the data with a VID before forwarding the data. In the illustrated example, data received at bridge port 17B is tagged with a VID=2 because for bridge port 17B the PVID=2. Similarly, data received at bridge port 17E is tagged with a VID=5 before it is forwarded onto segment 12 by way of bridge port 17A.

Figure 2:
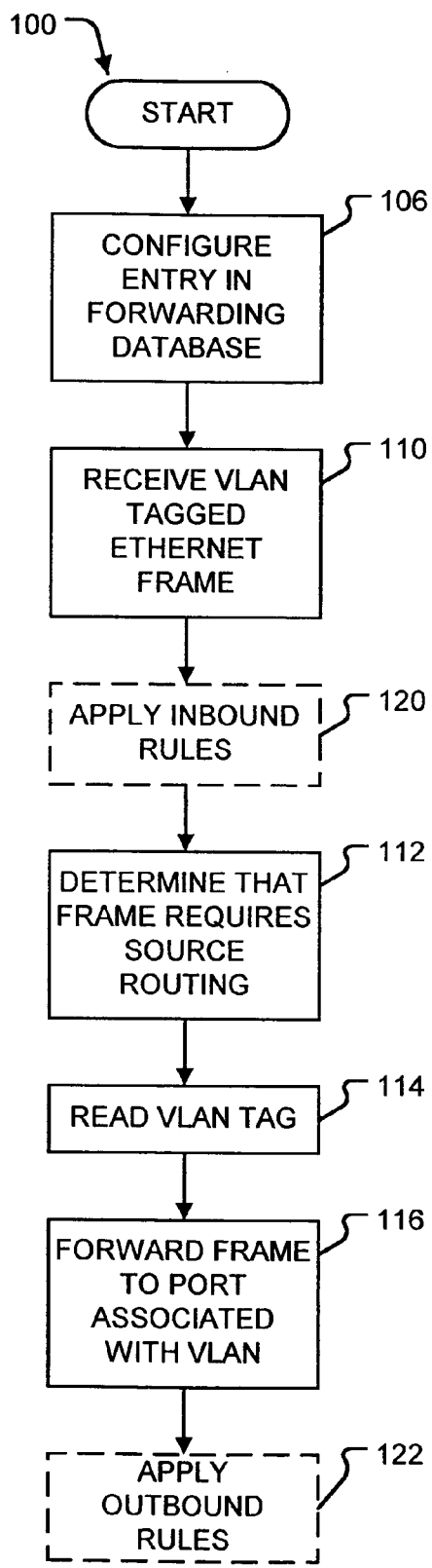
FIG. 2 is a flow chart which illustrates a method for forwarding data frames in a bridge having a shared forwarding database.

It can be appreciated from the foregoing that this invention provides a method for operating a bridge using a shared forwarding database which permits the same device to be configured as a member of different VLANs for which data should be sent and received on different bridge ports. The device does not need to be VLAN-aware (that is, the device does not need to be capable of recognizing, handling or originating VLAN-tagged data frames). FIG. 2 shows a method 100 according to an example embodiment of the invention.

Method 100 begins by creating an entry in a shared forwarding database 20 which associates an address (typically a MAC address) of a device which indicates that data addressed to that device should be source routed (block 106). If the bridge permits the association between VLAN IDs and ports to be configured then block 106 may comprise associating one or more VLANs with bridge ports 17 of the bridge.

Method 100 continues by receiving a VLAN-tagged ethernet frame (block 110). At the bridge the method determines that the frame requires source routing (block 112). Determining that the frame requires source routing may comprise looking up a destination MAC address for the frame in a shared filtering database 20. Upon determining that the frame requires source routing method 100 continues by reading the VLAN tag for the frame (block 114). The frame is then forwarded to a port associated with the VLAN (block 116).

Method 100 may optionally comprise applying one or more inbound rules to the frame upon reception of the frame at a bridge port (block 120). The inbound rules may include, for example:

a rule which specifies that a frame should be dropped if its destination address is associated in forwarding database 20 with the same bridge port at which the frame was received at bridge 10;

a rule which specifies that a frame should be dropped if it belongs to a VLAN which is not configured on the bridge 10.

Method 100 may optionally comprise applying one or more outbound rules (block 122) before forwarding a frame out of a bridge port. The outbound rules may comprise, for example:

a rule which specifies that a frame should be dropped if it belongs to a VLAN not associated with the port;

a rule that specifies that a VLAN tag should be stripped from data;

a rule that specifies that a VLAN tag should be added to data.

It can be appreciated that source routing, as described above, may be implemented by applying an inbound rule.

Figure 3:
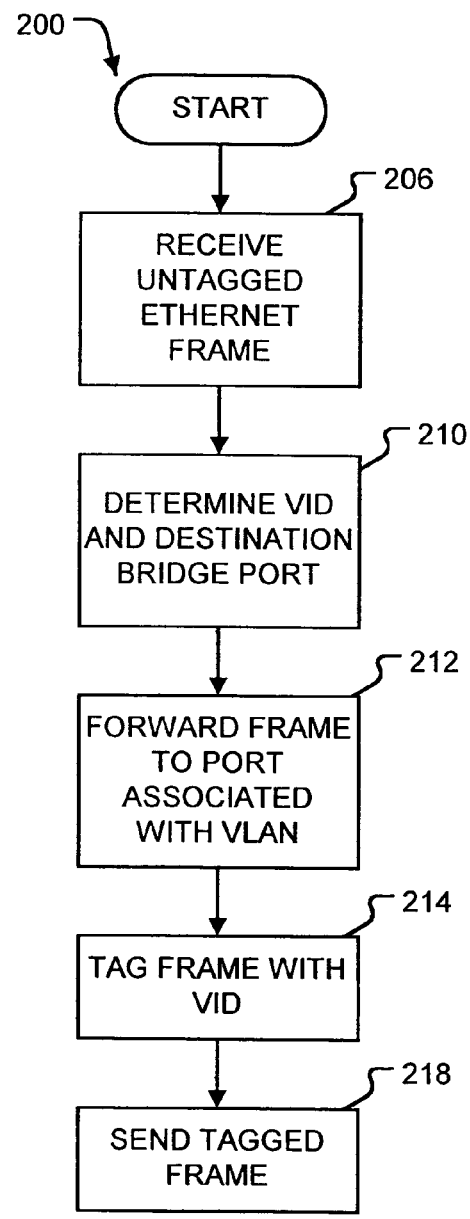
FIG. 3 is a block diagram showing an application of the invention.

FIG. 3 is a flow chart which illustrates a method 200 which may be performed for bridging untagged frames received, for example, from a server 24 or some other non-VLAN-aware device. Method 200 receives a frame at a bridge port (block 206). Bridge 10 then determines a VID for the frame (for example by looking up the PVID for the bridge port at which the frame arrived at bridge 10) and a destination bridge port for the frame (for example, by looking up the frame's destination address in shared filtering database 20) (block 210). In block 212, bridge 10 forwards the frame to the destination bridge port identified in block 210. In block 214 the frame is tagged with the VID determined in block 210. In block 216 the frame is sent by way of the destination bridge port. Although it is not shown in FIG. 3, inbound rules may be applied upon receipt of the frame and outbound rules may be applied before sending the frame.

Figure 4:
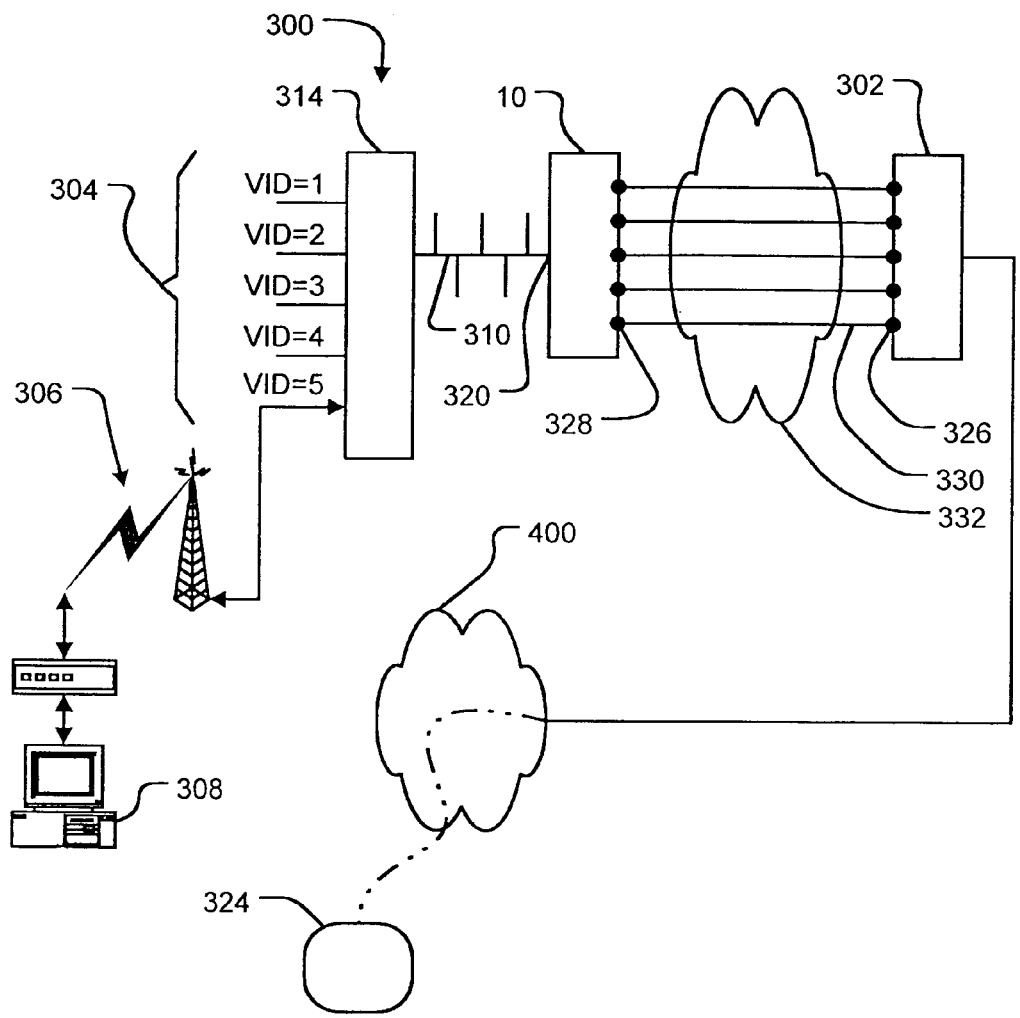
FIG. 4 is schematic illustration of a example application of a bridge according to the invention.

FIG. 4 illustrates an example application of a bridge 10 according to the invention. Bridge 10 connects a network 300 to a router 302 which may comprise a remote access server ("RAS"). Router 302 is not VLAN-aware. In this example, network 300 comprises a fixed wireless access network. Network 300 comprises a plurality of segments 304. Each of segments 304 includes a wireless link 306 which connects to one or more subscriber computers 308. Segments 304 are each connected to a trunk link 310 by a VLAN-aware switch 314. Switch 314 is configured to treat each segment 304 as belonging to a different VLAN. Each segment 304 may carry data in untagged frames. Switch 314 strips VLAN tags from frames before forwarding the frames to segments 304.

Switch 304 is connected to bridge 10 by trunk link 310. Data frames going to or from a segment 304 on trunk link 310 have VLAN tags which identify the VLAN of the segment 304 to which they are destined or from which they originated. Data on trunk link 310 is received at a local interface 320 of bridge 10.

Bridge 10 and router 302 provide routes for subscriber computers 308 to exchange data with devices, such as servers 324, on the public internet 400. Router 302 may comprise, for example, a broadband remote access server. Router 302 has a single MAC address and a plurality of ports 326. Ports 326 may comprise virtual ports, physical ports or a combination of physical and virtual ports. Each of ports 326 connects to a corresponding port 328 of bridge 10 by way of a channel 330 in a connection-based network 332. From the point of view of router 302 each of channels 330 may be associated with a subnet.

A server 324 send data to a subscriber computer 308 by way of router 302. Router 302 forwards the data on the connection 330 corresponding to the destination address for the data. The data is received at one of bridge ports 328 of bridge 10. Bridge 10 tags the data with a VLAN tag corresponding to the PVID of the port 328 at which the data was received. Bridge 10 may also look up the source address for the data (which is the MAC address of router 302) in its shared forwarding database 20 and locate a static entry which does not require updating.

The data passes to switch 314 which uses the VLAN tag to direct the data to a port connected to the appropriate segment 304. Switch 314 may strip the VLAN tag from the data before forwarding the data onto the segment 304.

Data can also pass in the opposite direction from the subscriber computer 308 to server 324. Subscriber computer 308 sends data to switch 314 which applies a VLAN tag to the data according to the port at which the data is received at switch 314 (i.e. according to the segment 304 from which the data originated). Typically router 302 will be set up as a default gateway for data originating on segments 304. Switch 314 forwards the data to bridge 10 by way of trunk link 310.

Bridge 10 receives the VLAN-tagged data at its local interface port 320 and looks up the destination address for the data (e.g. the MAC address of router 302) in its shared filtering database 20. Bridge 10 retrieves a reserved value which indicates that the data should be source-routed. Bridge then reads information from the data frame and sends the data frame to the bridge port corresponding to the information read from the data frame. The information read from the data frame may be a VID which identifies a VLAN to which the data frame belongs. In this case, after stripping off the VLAN tag, bridge 10 forwards the data to router 302 by way of the port 328 which corresponds to the information in the VLAN tag. Router 302 receives the data and forwards it toward its destination at server 224.

Data may be sent from a subscriber computer 308 on one segment 304 to a subscriber computer on a different segment 304 by way of router 302.

Certain implementations of the invention comprise computer processors which execute software instructions which cause the processors to perform a method of the invention. For example, one or more processors in a bridge 10 may implement the methods of FIGS. 2 and 3 by executing software instructions in a program memory accessible to the processors. The invention may also be provided in the form of a program product. The program product may comprise any medium which carries a set of computer-readable signals comprising instructions which, when executed by a computer processor, cause the data processor to execute a method of the invention. The invention may also be provided in a program product which contains information which when supplied to a FPGA configuration function configures a FPGA in a bridge to provide a bridge 10 which can function as described herein. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example: while ATM networks are given above as specific examples of connection-based networks the connection-based networks could also comprise other network types such as multi-protocol label switching (MPLS) networks. Channels 330 could comprise paths in an MPLS network.

Accordingly, the scope of the invention is to be construed in accordance with the substance defined by the following claims.

What is claimed is:

1. A method for routing data frames, the method comprising:
providing a bridge device having a plurality of ports and a shared forwarding database, the plurality of ports comprising a local interface port for connecting the bridge to a plurality of end devices operating on different virtual local area networks (VLANs) and a plurality of remote interface ports for connecting to a connection-based network;
creating an entry in the shared forwarding database, the entry indexed exclusively by an address of a non-VLAN-aware network element connected to the connection-based network and the entry indicating that data addressed to the non-VLAN-aware network element should be source routed;
receiving, at the local interface port from one of the end devices, a data frame addressed to the non-VLAN-aware network element;
determining that the data frame requires source routing based on the entry in the shared forwarding database;
reading source routing data from the data frame, the source routing data independent of the address of the non-VLAN-aware network element;
identifying one of the remote interface ports associated with the one of the end devices, based at least in part on the source routing data; and,
sending the data frame to the identified one of the remote interface ports.

2. The method of claim 1 wherein the data frame comprises a VLAN tag corresponding to the VLAN on which the one of the end devices operates and reading the source routing data from the data frame comprises reading the VLAN tag.

3. The method of claim 2 wherein each of the plurality of remote interface ports is associated with a port VLAN identifier.

4. The method of claim 3 wherein reading the VLAN tag comprises reading a first VID specified in the VLAN tag and wherein identifying the one of the remote interface ports comprises identifying the remote interface port associated with the port VLAN identifier equal to the first VID.

5. The method of claim 4 comprising receiving a second data frame at the identified one of the remote interface ports and tagging the second data frame with the first VID.

6. The method of claim 4 comprising:
receiving, at the identified one of the remote interface ports, a second data frame from a second network element having a second address at a second one of the plurality of ports; and
dynamically updating the shared forwarding database in response to receiving the second data frame, wherein dynamically updating the shared forwarding database comprises:
using the second address to look up a second entry in the shared forwarding database, the second entry indexed by the second address;
if the second entry is present in the shared forwarding database, ensuring that the second entry indicates that data addressed to the second address should be routed to the identified one of the remote interface ports; and
if the second entry is not present in the shared forwarding database, creating the second entry and ensuring that the second entry indicates that data addressed to the second address should be routed to the identified one of the remote interface ports.

7. The method of claim 6 comprising:
receiving, at the identified one of the remote interface ports, a third data frame from the non-VLAN-aware network element;
using the address of the non-VLAN-aware network element to look up the entry in the shared forwarding database
determining that the shared forwarding database should not be dynamically updated in response to receiving the third data frame based on the entry in the shared forwarding database.

8. The method of claim 6 comprising:
reading a destination address from the second data frame;
using the destination address to look up a third entry in the shared forwarding database, the third entry indexed by the destination address and the third entry indicating that data addressed to the destination address should be routed to a third one of the plurality of ports; and
routing the second data frame to the third one of the plurality of ports.

9. The method of claim 3 wherein reading the VLAN tag comprises reading a first VID specified in the VLAN tag and wherein identifying the one of the remote interface ports comprises identifying the remote interface port associated with the port VLAN identifier corresponding to the first VID according to a correspondence maintained in the bridge.

10. The method of claim 9 comprising receiving a second data frame at the identified one of the remote interface ports and tagging the second data frame with the first VIP.

11. The method of claim 1 wherein the address comprises a MAC address of the non-VLAN-aware network element and determining that the data frame requires source routing comprises looking up the MAC address in the shared forwarding database.

12. The method of claim 1 comprising applying one or more inbound rules to the data frame before determining that the data frame requires source routing.

13. The method of claim 12 comprising applying one or more outbound rules to the data frame after identifying the one of the remote interface ports.

14. The method of claim 1 comprising applying one or more outbound rules to the data frame after identifying the one of the remote interface ports.

15. The method of claim 1 comprising:
receiving, at the identified one of the remote interface ports, a second data frame from a second network element having a second address ; and
dynamically updating the shared forwarding database in response to receiving the second data frame, wherein dynamically updating the shared forwarding database comprises:
using the second address to look up a second entry in the shared forwarding database, the second entry indexed by the second address;
if the second entry is present in the shared forwarding database, ensuring that the second entry indicates that data addressed to the second address should be routed to the identified one of the remote interface ports; and
if the second entry is not present in the shared forwarding database, creating the second entry and ensuring that the second entry indicates that data addressed to the second address should be routed to the identified one of the remote interface ports.

16. The method of claim 15 comprising:
receiving, at the identified one of the remote interface ports, a third data frame from the non-VLAN-aware network element;
using the address of the non-VLAN-aware network element to look up the entry in the shared forwarding database
determining that the shared forwarding database should not be dynamically updated in response to receiving the third data frame based on the entry in the shared forwarding database.

17. The method of claim 15 comprising:
reading a destination address from the second data frame;
using the destination address to look up a third entry in the shared forwarding database, the third entry indexed by the destination address and the third entry indicating that data addressed to the destination address should be routed to a third one of the plurality of ports; and
routing the second data frame to the third one of the plurality of ports.

18. A method according to claim 1 comprising stripping the source routing data from the data frame prior to sending the data frame to the identified one of the remote interface ports.

19. A bridge comprising:
a plurality of bridge ports comprising a local interface port connected to a plurality of end devices operating on different virtual local area networks (VLANs) and a plurality of remote interface ports connected to a connection-based network, the connection-based network comprising a non-VLAN-aware network element;
a shared forwarding database, the shared forwarding database indexed exclusively by a single address field and the shared forwarding database comprising a plurality of first records, each first record associating an address with one of the bridge ports, and at least one second record, the at least one second record associating a corresponding second address with information indicating that data sent to the corresponding second address requires source routing, the corresponding second address being the address of the non-VLAN-aware network element;

the bridge being configured to respond to receipt, at the local interface port, of a data frame from one of the end devices and addressed to the corresponding second address by:

determining from the at least one second record that the data frame requires source routing;

reading source routing information from the data frame, the source routing information independent of the corresponding second address;

identifying one of the remote interface ports associated with the one of the end devices based at least in part on the source routing information; and forwarding the data frame to the identified one of the remote interface ports.

20. A bridge according to claim 19 wherein the bridge is configured to strip the source routing information from the data frame prior to forwarding the data frame to the identified one of the remote interface ports.

* * * * *